UNITED STATES PATENT OFFICE.

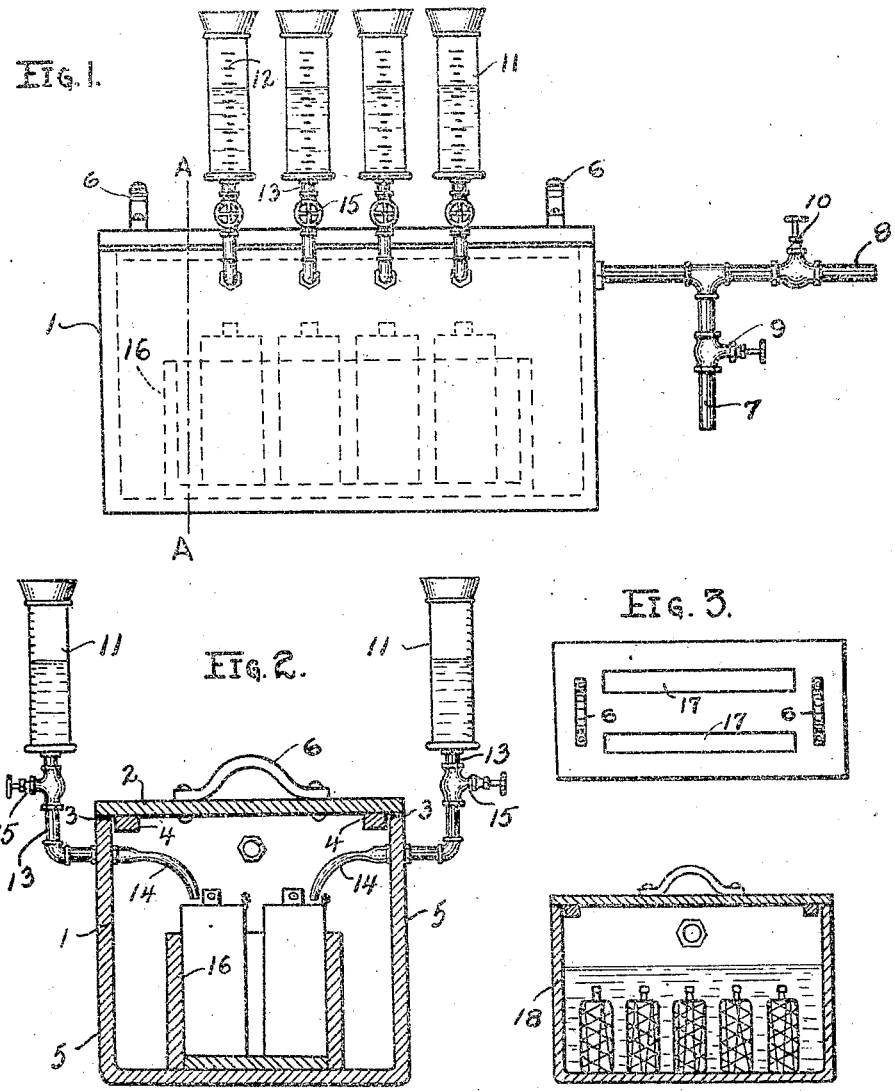

WILLIAM R. CLYMER, OF CLEVELAND, OHIO, ASSIGNOR TO NATIONAL CARBON COMPANY, OF CLEVELAND, OHIO, A CORPORATION OF NEW JERSEY.

DRY CELL.

1,198,619.  Specification of Letters Patent.  Patented Sept. 19, 1916.

Application filed December 9, 1912.  Serial No. 735,605.

*To all whom it may concern:*

Be it known that I, WILLIAM R. CLYMER, a citizen of the United States, residing at Cleveland, in the county of Cuyahoga and State of Ohio, have invented a certain new and useful Improvement in Dry Cells, of which the following is a full, clear, and exact description.

My invention relates to dry cells and the object is to increase the amount of electrolyte solution in the cell by thoroughly impregnating the mix with it.

Dry cells are usually made by mixing powdered graphite and amorphous carbon with a small amount of electrolyte solution, usually zinc chlorid and ammonium chlorid. This mix is then tamped in a paper lined zinc can around the carbon electrode. If the mix has more than a small amount of electrolyte it cannot be tamped solidly and since a well-tamped mix is necessary to produce a good cell, it therefore follows that there is a limited amount of electrolyte that can be mixed in with the other ingredients before they are tamped.

The electrolyte must diffuse through the lining of the cell to the zinc in order to become active. There is therefore not so much of the solution reaching the lining and zinc as would be desired.

If the lining of the cell is moistened with water or solution before the mix is placed therein, a considerable part of the liquid is absorbed by the mix. This drying out of the lining is objectionable as it increases the internal resistance of the cell.

It will thus be apparent that an increase in the electrolyte content would be very desirable, but the amount that can be added to the untamped mix cannot be increased for the reason previously given. The solution, however, will not penetrate to any extent into the mix if it is poured on top of it unless it is allowed to stand for a long time.

My invention overcomes the foregoing difficulties by providing a method for quickly impregnating the tamped mix with the solution.

The method and apparatus for carrying it out will now be described in detail.

Referring to the drawings: Figure 1 is a side view of an apparatus for carrying out the method. Fig. 2 is a sectional view taken on the line A—A of Fig. 1. Fig. 3 is a view of another form of lid to be used with the apparatus of Fig. 1. Fig. 4 is a view of apparatus for impregnating a modified form of battery.

In my process dry cells may be made in the usual method till the mix is tamped in the zinc can. In order to increase the amount of electrolyte solution in the mix and other parts of the cell, I pour solution on top of the mix, there being ample room for it at the top of the unsealed cell. The cell is then placed in some receptacle so that the air can be exhausted from the mix. This bubbles up through the solution on top of it and after a sufficient vacuum is produced the air is readmitted to the cell. The solution is thus forced down into the interstices in the cell by the pressure above it. In some cases it is advantageous to apply more than atmospheric pressure to the cell after the air has been exhausted.

The method covers the idea of using pressure to force the electrolyte into the cell, and this can be done by applying pressure to the cell without first exhausting the air. This method would not be so satisfactory because when the pressure is restored to the atmospheric condition, the solution will be partly forced out from the mix. However, part of the solution would remain therein, and the cell would be more efficient than one constructed by the old methods.

When all the solution is first placed on top of the mix and the air afterward exhausted it is liable to cause some of the mix to bubble over the top of the can. This sometimes causes particles of the mix to be later forced between the lining of the cell and the zinc can when the pressure is readmitted. This is overcome by putting part of the solution on top of the mix and forcing part or all of it into it by the vacuum process just described. The cell is then removed from the vacuum chamber, additional solution added and again subjected to the vacuum process. As many treatments as may be desired may be taken in order to force solution into the cell, but I have found that the required amount of impregnation can be obtained by two treatments, substantially half of the solution being added each time. Another way of overcoming this occasional defect is to exhaust the air first and then admit the solution to the top of the cell. The solution is then forced into the mix by admitting pressure as previously described. This may be accomplished in several ways, a typical one being illustrated in the drawings. A receptacle 1 may be constructed of wood, steel or any other material so as to be substantially air tight. The receptacle may be made in the shape of a steel box with the joints welded together in a well known way. The lid 2 is removable and makes a smooth fit with the top of the box. To prevent air from entering, the top edges may have a gasket 3. Pieces 4 may be secured to the lid 2 to support the sides 5 when the air is exhausted from the interior. Handles 6 permit of easy removal of the top when pressure is readmitted.

The air is exhausted through pipe 7 and pressure is admitted through pipe 8. Valves 9 and 10 control the passages through the pipes 7 and 8.

A series of tanks 11 contain the electrolyte, being preferably constructed of glass and having graduations 12 thereon. The solution is led through the pipes 13 to the interior of the box 1, each pipe having a flexible connection 14 as shown in Fig. 2. Valves 15 control the passage of solution through the pipes.

To carry out the process the mix is tamped or placed in the can in the usual way. The cells are then put inside the receptacle 1. This may be advantageously done by means of a removable box 16. The lid 2 is replaced and the air exhausted through the pipe 7, valve 10 being closed and valve 9 being open. When a sufficient vacuum is obtained the operator opens each valve 15 to admit the solution to the top of the cells through the flexible connections 14. As soon as sufficient solution has been admitted the valves are closed. This may be gaged by noting the height of the solution in the tanks. The scale on each tank is preferably proportioned so that the fluid between two adjacent markings is the required amount.

When fluid has been admitted to all the cells, the pressure is admitted through pipe 8, valve 10 being open and valve 9 closed. The top 2 is then taken off and the box of cells removed.

In most cases it will be sufficient to exhaust the air only once, but if it is desired to completely saturate the mix the process may be repeated several times for each group of cells, admitting a small amount of solution each time the air is exhausted till the mix is saturated.

In order to enable the operator to see if the electrolyte has been forced into the mix without removing the cover, the lid 2 may have two glass panes 17 shown in Fig. 3. These may be sealed in so as to make air tight joints.

Some dry cells, particularly small ones, have the compacted mix around the central electrode and wrapped with porous material. This part is then placed in the lined zinc can. Sometimes flour paste is first placed in the can. This type of cell part is illustrated in U. S. Patents Nos. 808,755 and 809,647. In Fig. 4 I have shown how such cell parts may be impregnated with solution. They may be placed in a tank 18 containing sufficient solution to cover them. The air is then exhausted and readmitted to force the solution into the mix. Afterward the parts are placed in the zinc cans as described.

The amount of electrolyte in the cells may be increased as much as 50% by my process and hence the depolarizing properties and life of the cells is greatly increased.

Having described my invention what I claim is:

1. The steps in the process of making dry cells, which consists in compressing a mix, adding electrolyte to the mix and placing the compressed mix and electrolyte under increased pressure to force the electrolyte into the mix.

2. The process of impregnating a dry cell with electrolyte which consists in exhausting the air from the cell and then introducing electrolyte therein.

3. The process of impregnating the mix of a dry cell which consists in exhausting the air therefrom through the open end of the cell, and forcing the electrolyte through said end into the mix by readmitting pressure thereto.

4. The steps in the process of making dry cells which consists in compressing a moist mix withdrawing the air therefrom, adding additional electrolyte solution and forcing it into the mix by re-admitting the air thereto.

5. The steps in the process of making dry cells which consists in placing a cell containing the mix and negative electrode in a chamber, exhausting the air therefrom, putting the electrolyte solution on top of the mix, and readmitting the air to force the solution into the mix.

6. The process of making dry cells which consists in putting the negative electrode in the container, tamping the mix around it, placing the cell under reduced pressure, adding the electrolyte thereto and increasing the pressure to force it into the cell.

7. The process of making dry cells which consists in putting the negative electrode in the container, tamping a moist mix around it, placing the cell under reduced pressure to exhaust the inclosed air, adding additional electrolyte to the container and increasing the pressure to force it into the cell.

In testimony whereof, I hereunto affix my signature.

WILLIAM R. CLYMER.

Witnesses:
W. N. HOUSE,
H. G. GROVER.